US010880713B2

(12) United States Patent
Jamadagni et al.

(10) Patent No.: US 10,880,713 B2
(45) Date of Patent: Dec. 29, 2020

(54) LOW BANDWIDTH MACHINE TYPE COMMUNICATION IN A LONG TERM EVOLUTION NETWORK

(71) Applicant: Samsung Electronics Co., Ltd., Gyeonggi-do (KR)

(72) Inventors: Satish Nanjunda Swamy Jamadagni, Bangalore (IN); Sarvesha Anegundi Ganapathi, Bangalore (IN); Pradeep Krishnamurthy Hirisave, Bangalore (IN); Jinesh Parameshwaran Nair, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/598,190

(22) Filed: May 17, 2017

(65) Prior Publication Data

US 2017/0325048 A1 Nov. 9, 2017

Related U.S. Application Data

(63) Continuation of application No. 14/359,276, filed as application No. PCT/KR2012/009802 on Nov. 19, 2012, now Pat. No. 9,686,633.

(30) Foreign Application Priority Data

Nov. 18, 2011 (IN) .......................... 3967/CHE/2011

(51) Int. Cl.
*H04W 4/00* (2018.01)
*H04L 5/00* (2006.01)
(Continued)

(52) U.S. Cl.
CPC ............. *H04W 4/70* (2018.02); *H04L 5/0044* (2013.01); *H04L 5/0053* (2013.01);
(Continued)

(58) Field of Classification Search
CPC . H04W 4/005; H04W 72/0453; H04W 16/06; H04W 72/005; H04L 5/0044; H04L 5/0053

See application file for complete search history.

(56) References Cited

U.S. PATENT DOCUMENTS

| 2004/0128608 | A1* | 7/2004 | Kim | ................... | G11B 20/1403 714/763 |
| 2009/0023460 | A1* | 1/2009 | Cho | ........................ | H04W 4/02 455/456.2 |

(Continued)

FOREIGN PATENT DOCUMENTS

WO 2011069295 A1 6/2011

OTHER PUBLICATIONS

Foreign Communication from Related Counterpart Application; Indian Patent Application No. IN3967/CHE/2011; Indian Office Action dated Nov. 14, 2017; 6 pages.

(Continued)

*Primary Examiner* — Jamal Javaid
*Assistant Examiner* — Thad N Defauw (57) ABSTRACT

The present invention provides a method and system for enabling machine type communication in a long term evolution (LTE) network environment. In one embodiment, a Physical (PHY) layer of a LTE protocol stack maps data bits in resource elements of a logical channel to resource elements of a physical channel. The PHY layer identifies the data bits intended for legacy devices but mapped to a first set of resource elements of machine type communication (MTC) devices and the data bits intended for the MTC device but mapped to the second set of resource elements of the legacy devices. Accordingly, the PHY layer remaps the data bits intended for the legacy devices to the second set of resource elements and the data bits intended for the MTC (Continued)

devices to the first set of resource elements prior to transmission.

14 Claims, 11 Drawing Sheets (51) Int. Cl.
*H04W 72/04* (2009.01)
*H04W 16/06* (2009.01)
*H04W 72/00* (2009.01)
*H04W 4/70* (2018.01)
*H04W 76/10* (2018.01)

(52) U.S. Cl.
CPC ....... *H04W 16/06* (2013.01); *H04W 72/0453* (2013.01); *H04W 72/005* (2013.01); *H04W 76/10* (2018.02)

(56) References Cited

U.S. PATENT DOCUMENTS

| | | | |
|---|---|---|---|
| 2010/0067418 A1 | 3/2010 | Parkvall et al. | |
| 2010/0067464 A1 | 3/2010 | Higuchi | |
| 2011/0264740 A1 | 10/2011 | Diachina et al. | |
| 2012/0243431 A1* | 9/2012 | Chen | H04W 72/0406 370/252 |
| 2012/0327894 A1* | 12/2012 | Axmon | H04W 48/12 370/330 |
| 2013/0089061 A1* | 4/2013 | Lim | H04W 72/0413 370/329 |
| 2013/0176995 A1 | 7/2013 | Park et al. | |

OTHER PUBLICATIONS

Geoff Varrall "RF Cost Economics for Handsets", White Paper, Sep. 5, 2007, 27 pages.
International Search Report dated Mar. 26, 2013 in connection with International Patent Application No. PCT/KR2012/009802, 5 pages.
Written Opinion of International Searching Authority dated Mar. 26, 2013 in connection with International Patent Application No. PCT/KR2012/009802, 8 pages.
3GPP TSG RAN WG1 #66bis; "Specification aspects on low-cost MTC"; R1-113284, Zhuhai, China, Oct. 10-14, 2011 4 pages.

* cited by examiner

LOW BANDWIDTH MACHINE TYPE COMMUNICATION IN A LONG TERM EVOLUTION NETWORK

CROSS-REFERENCE TO RELATED APPLICATION(S)

The present application is a continuation of U.S. patent application Ser. No. 14/359,276 filed on May 19, 2014 and claims priority under 35 U.S.C. § 365 to International Patent Application No. PCT/KR2012/009802 filed Nov. 19, 2012, entitled "LOW BANDWIDTH MACHINE TYPE COMMUNICATION IN A LONG TERM EVOLUTION NETWORK". International Patent Application No. PCT/KR2012/009802 claims priority under 35 U.S.C. § 365 and/or 35 U.S.C. § 119(a) to India Patent Application No. 3967/CHE/2011 filed Nov. 18, 2011 and which are incorporated herein by reference into the present disclosure as if fully set forth herein.

TECHNICAL FIELD

The present invention generally relates to the field of long term evolution network, and more particularly relates to machine type communication in a long term evolution network.

BACKGROUND ART

Long Term Evolution (LTE) is a technology that is being standardized by Third Generation Partnership Project (3GPP) forum as part of the 4th Generation wireless network evolution. LTE is flexible on spectrum requirement point and can operate in different frequency bands. The list of flexibility requirement LTE spectrum allocations (1.25, 1.6, 2.5, 5, 10, 15 and 20 MHz) and furthermore, LTE can also operate in unpaired as well as paired spectrum. From a user equipment perspective, it is mandatory in LTE for user equipments to support 20 MHz frequency band.

As more and more MTC devices are deployed in this field, this naturally increases the reliance on Global System for Mobile Communications (GSM)/General Packet Radio Service (GPRS) networks. This will cost operators not only in terms of maintaining multiple Radio Access Technology (RATs), but it also prevents operators from reaping the maximum benefit out of their spectrum (given the non-optimal spectrum efficiency of GSM/GPRS). Because usage of high number of MTC devices, the overall resource they need for service provision may be correspondingly significant and inefficiently assigned.

Low cost LTE modems are critical for supporting and migrating M2M applications to LTE networks. The LTE baseband processing circuits and Radio Frequency (RF) components are critical components in the overall cost. RF Bill Of Material (BOM) recurring costs is not insignificant at all, it is about 4 dollars for a dual band GSM phone, 5 dollars for a tri band phone and 6 dollars for a quad band phone, as a result BOM for RF components for LTE will be much higher.

Currently approaches for achieving low cost MTC devices in LTE networks are as follows:

1) Dedicated MTC LTE Carrier:

A dedicated narrowband carrier could be used for MTC devices. The advantage of this approach is that there are no specifications impacts in this approach. The Disadvantages are that there may not be available spectrum to deploy a dedicated MTC carrier. Some eNode-Bs might not have the ability to support a narrowband carrier (e.g., as may be the case if it is necessary to split an existing carrier). This also goes against a key requirement of "Target operation of low-cost MTC devices and legacy devices on the same carrier" and use of a separate carrier for the support of low bandwidth MTC devices would be directly contradictory to this requirement.

2) Relay Node: The possibility of using a relay node where the Un bandwidth is (evidently) the same as that of the legacy carrier, but the Uu bandwidth is a low bandwidth that is compatible with MTC devices. Although the use of relays was originally proposed from the perspective of bandwidth reduction, they might also be useful from the perspective of improving coverage for any MTC devices that have a lower transmit power capability or for single receive antenna devices. Advantages are that there are no impacts on the legacy eNode B and the potential to improve uplink and downlink coverage for cost reduced devices that have either a single receive chain or low transmit power. The disadvantages are that the deployment of extra hardware is required. Existing relay nodes would not necessarily support this functionality and may need to be upgraded or replaced. The complexity of existing relay nodes would be increased. MTC devices in the coverage area of the donor eNode-B (as opposed to a relay node) would not be supported by the low bandwidth Uu link.

The drawings described herein are for illustration purposes only and are not intended to limit the scope of the present disclosure in any way.

BEST MODE FOR CARRYING OUT THE INVENTION

The present invention provides a method and system for enabling machine type communication over a narrow frequency region within a larger bandwidth cell. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1:
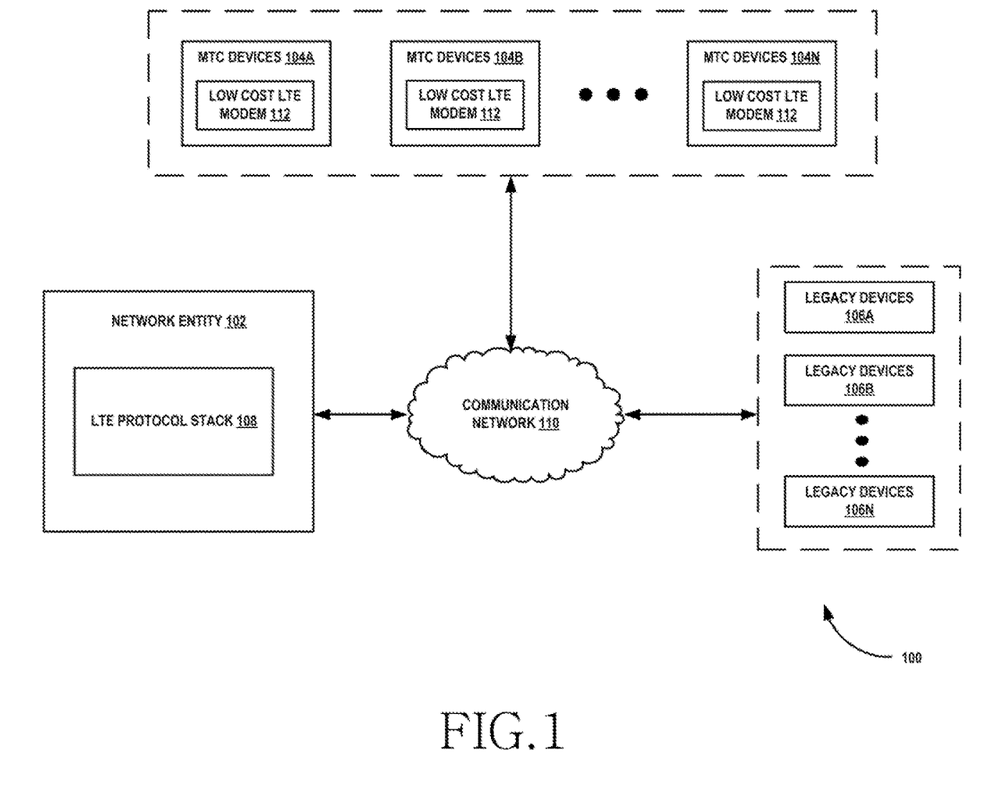
FIG. 1 is a block diagram illustrating an exemplary long term evolution (LTE) network system, according to one embodiment.

FIG. 1 is a block diagram illustrating an exemplary long term evolution (LTE) network system 100, according to one embodiment. The LTE network system 100 includes a network entity 102, low bandwidth MTC devices 104A-N, and legacy devices 106A-N. The network entity 102 is wirelessly connected to the low bandwidth MTC devices 104A-N and the legacy devices 106A-N via the communication network 110.

Each of the MTC devices 104A-N includes a low cost LTE modem 112 configured for operating in narrow bandwidth of 1.25 MHz. The network entity 102 may comprise a base station in an LTE network, sometimes referred to as an Evolved Node B (eNodeB). The network entity 102 includes a LTE protocol stack 108. The LTE protocol stack 108 is a layered protocol stack. Each layer of the protocol stack 108 represents a set of protocols or functions needed to communicate over the network 110.

Figure 2:
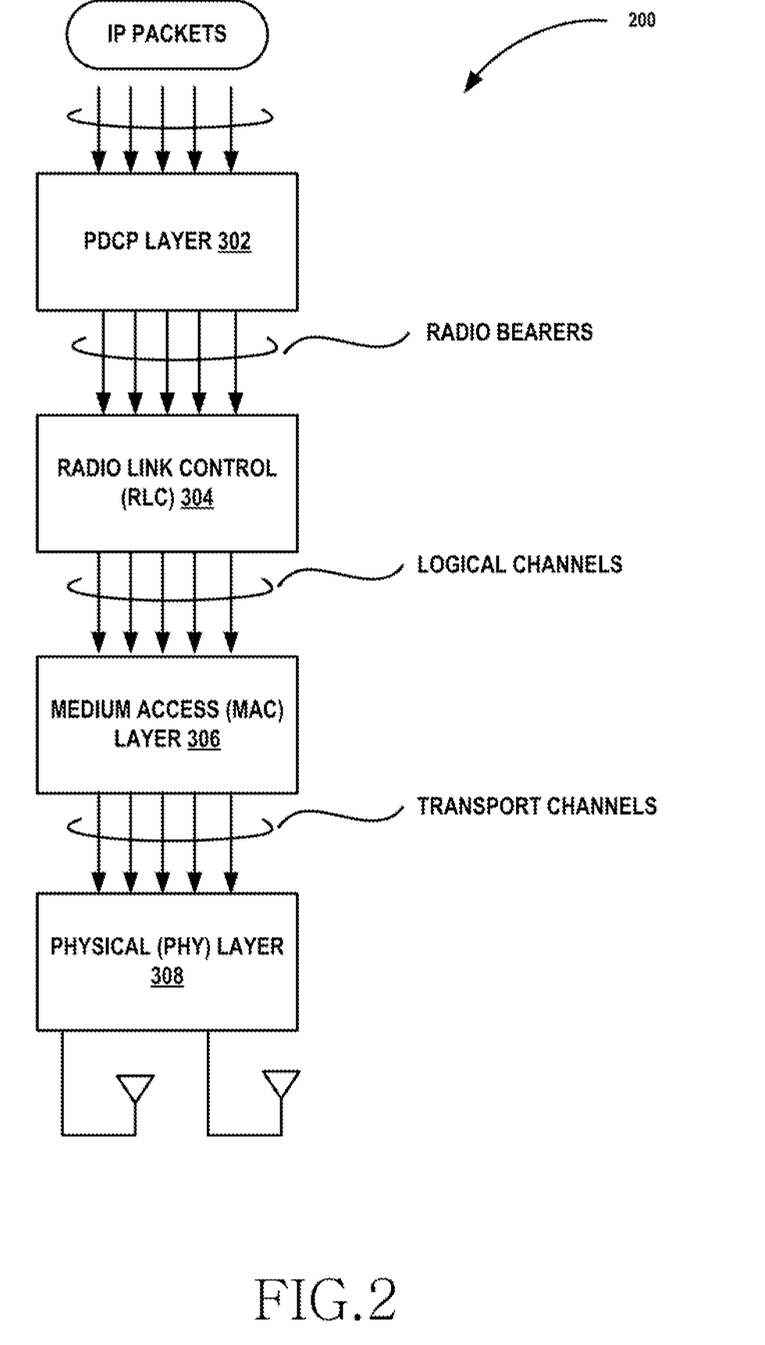
FIG. 2 illustrates a general overview of the LTE protocol stack for communications between a transmitting terminal and a receiving terminal in LTE systems.

Referring to FIG. 2, the LTE protocol stack 108 includes a packet data convergence protocol (PDCP) layer 202, a radio link control (RLC) layer 204, a medium access control (MAC) layer 206, and the physical (PHY) layer 208. The LTE protocol stack 108 is typically implemented by a specially programmed processor.

User plane data in the form of IP packets to be transmitted enters the PDCP layer 202 where the IP headers may be compressed to reduce the number of bits transmitted over the air interface. The PDCP layer 202 also performs ciphering and deciphering of the IP packets for security. The RLC layer 204 ensures almost error free, in-sequence delivery of compressed IP packets to a PDCP layer at the receiving terminal, which is needed for certain types of communication. At the transmitting terminal, the RLC layer 204 segments and/or concatenates compressed IP packets received over radio bearers from the PDCP layer 202 to create RLC protocol data units (PDUs).

The MAC layer 206 maps RLC PDUs received from the RLC layer 204 on various logical channels to corresponding transport channels (also referred to as physical channels). The MAC layer 206 is also responsible for uplink and downlink scheduling. The MAC PDUs are fed by the MAC layer 206 to the PHY layer 208. The PHY layer 208 handles coding/decoding, modulation/demodulation, interleaving, and mapping of data bits prior to transmission of one or more PHY layer PDUs.

According to one embodiment, the network entity 102 allocates a radio access channel (RACH) region in a frequency region dedicated for low bandwidth MTC devices (herein after referred to as '1.25 MHz frequency region') to the MTC devices 104A-N. Then, the network entity 102 transmits a MTC specific information message indicating the allocated RACH region and a common search space to the MTC devices 104A-N. In response, the MTC devices 104A-N send a RACH message on the RACH region in the 1.25 MHz frequency region. As a consequence, the network entity 102 establishes a Radio Resource Connection with the MTC device 104A and configures a dedicated search space for the MTC devices 104A-N upon successful establishment of the radio resource connection. Furthermore, the network entity 102 allocates resources for the MTC devices 104A-N within the 1.25 MHz frequency region and indicates the resources allocated within the 1.25 MHz frequency region to the MTC devices 104A-N.

Prior to transmission of data, the PHY layer 208 maps the interleaved data bits intended for the MTC devices 104A-N to respective resource elements of a physical channel(s) belonging to 1.25 MHz frequency region in a 20 Mhz frequency band. The PHY layer 208 also maps the interleaved data bits intended for the legacy devices 106A-N to respective resource elements of the physical channel belonging to a frequency region outside the 1.25 MHz frequency region and within the 20 MHz frequency band. Accordingly, the eNodeB 102 transmits the data bits mapped to the respective resource elements over a radio frequency corresponding to the 1.25 MHz frequency region and the region outside the 1.25 MHz frequency region to the MTC devices 104A-N and the legacy devices 106A-N respectively.

Figure 3A:
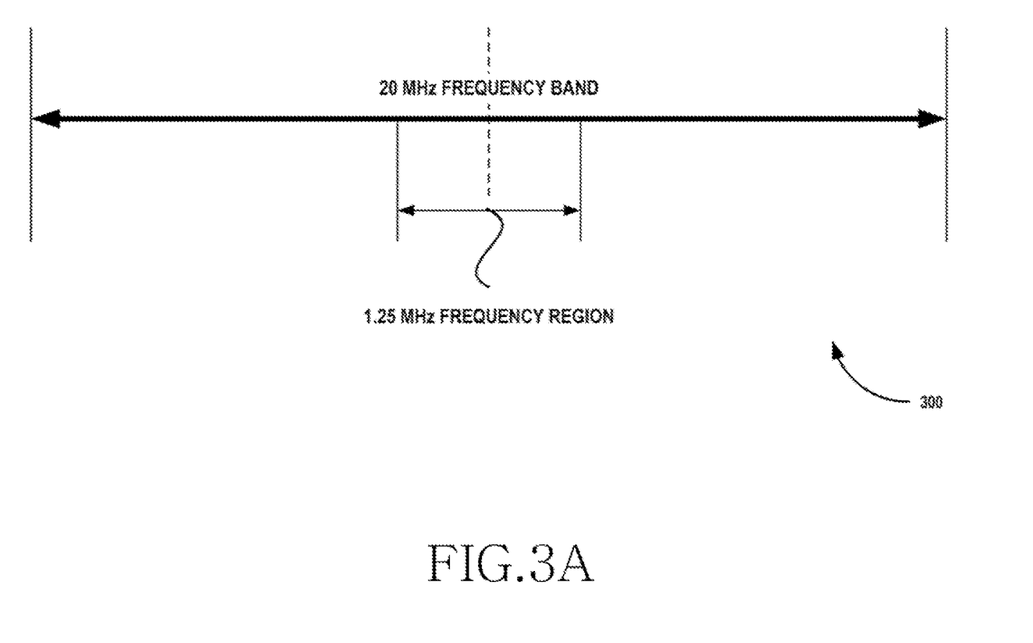
FIG. 3A is a schematic representation illustrating co-existence of 1.25 MHz frequency region within 20 MHz frequency band, according to one embodiment.

FIG. 3A is a schematic representation 300 illustrating co-existence of 1.25 MHz frequency region within 20 MHz frequency band, according to one embodiment. According to the present invention, the eNodeB 102 schedules data for the MTC devices 104A-N on narrow bandwidth of 1.25 MHz and the legacy devices 106A-N are scheduled on a region outside the 1.25 MHz frequency region and within 20 MHz.

Figure 3B:
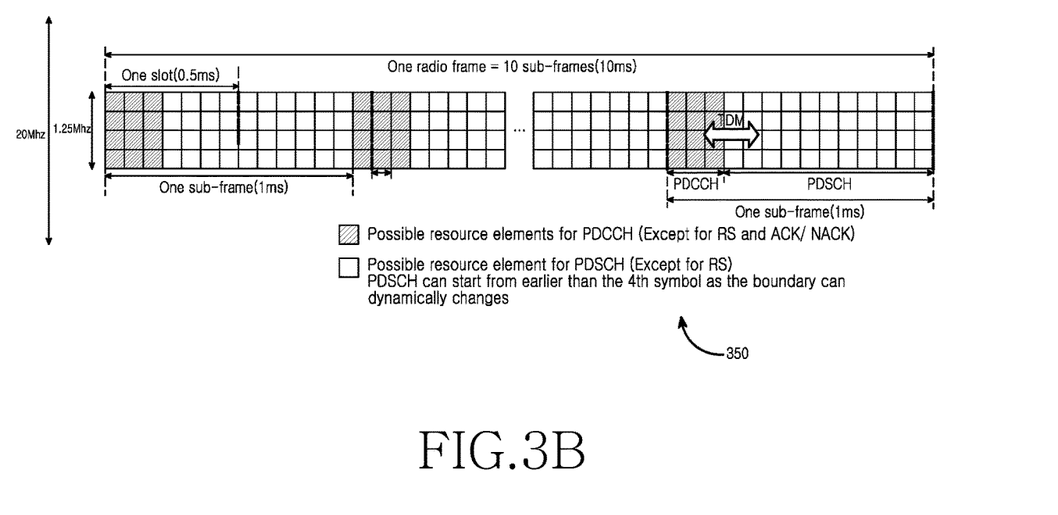
FIG. 3B is a schematic representation illustrating scheduling of data bits over a 1.25 MHz frequency region in a radio frame, according to one embodiment.
Figure 10:
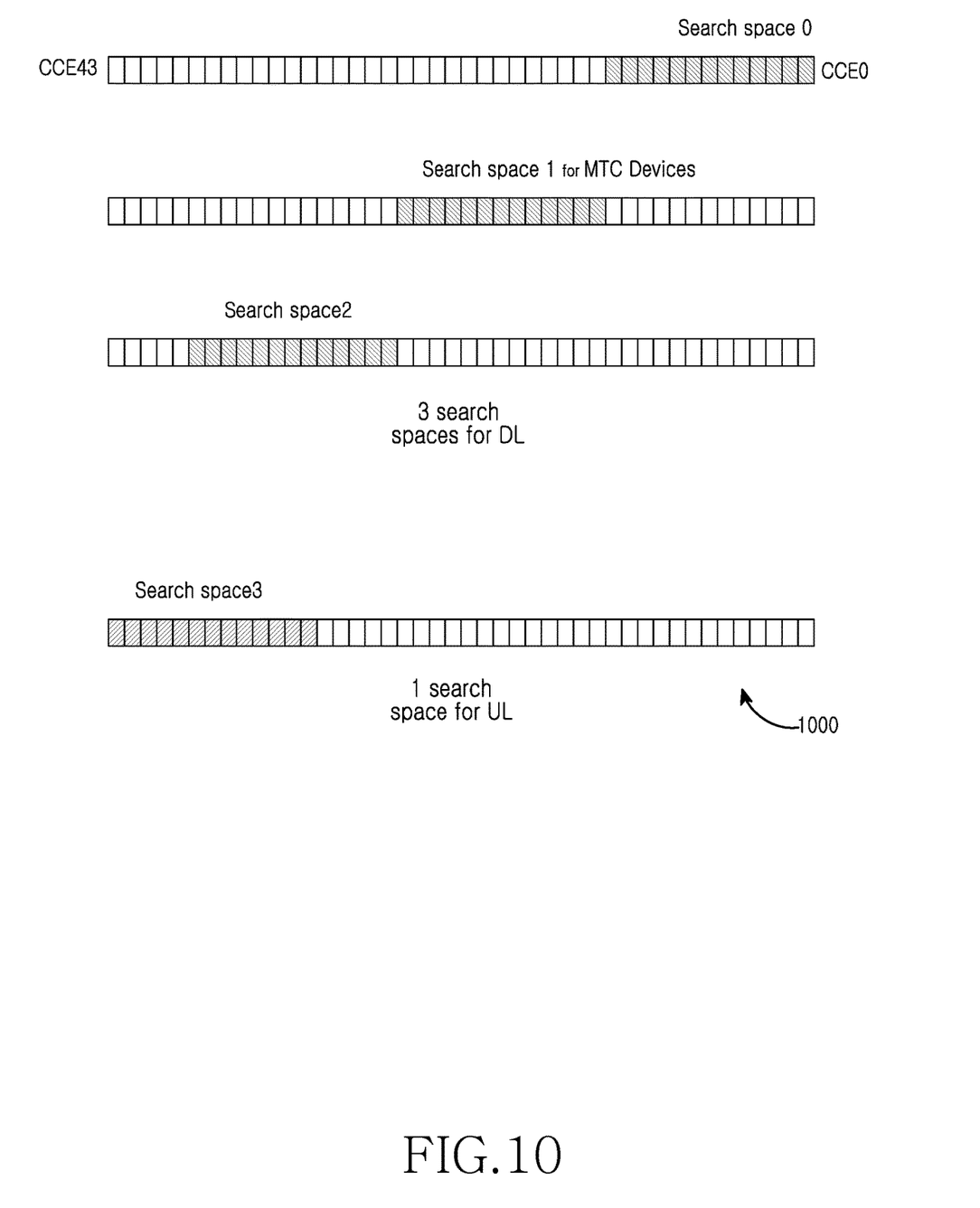
FIG. 10 is a schematic representation illustrating the network entity configures a dedicated search space for the MTC device upon successful establishment of the radio resource connection.

FIG. 3B is a schematic representation 350 illustrating scheduling of data bits (e.g., MTC data) over a 1.25 MHz frequency region in a radio frame, according to one embodiment. As depicted, the eNodeB 102 schedules control channels (e.g., PDCCH) in resource elements belonging to 1.25 MHz frequency region of a first three OFDM symbols of a subframe. Also, the eNodeB 102 schedules resource channels (e.g., Packet Data Control Channel (PDCCH)) in resource elements of 1.25 MHz frequency region starting from the fourth OFDM symbol of the subframe. It can be PDCCH scheduling could be based on Downlink Control Information (DCI) formats or on blind decoding. If the PDCCH scheduling is based on blind decoding, new control channel elements (CCEs) are defined to reduce decoding combinations (i.e., 1, 2, 4, 8 CCE aggregation in LTE, each starting on mod N boundary where N=1, 2, 4, 8). Also, different dedicated search spaces are defined to reduce the decoding combinations for the blind decoding case as illustrated in FIG. 10. Also, in the present invention, PCFICH and PHICH are scheduled in the 1.25 MHz frequency region. The advantage of this approach is that one set is sufficient for both MTC devices and legacy devices and also frequency diversity is reduced. In another embodiment, a second set of PCFICH and PHICH are defined only for the low bandwidth MTC devices 104A-N. In yet another embodiment, PHICH is defined for the low bandwidth MTC devices 104A-N and no PCFICH is used.

Figure 4:
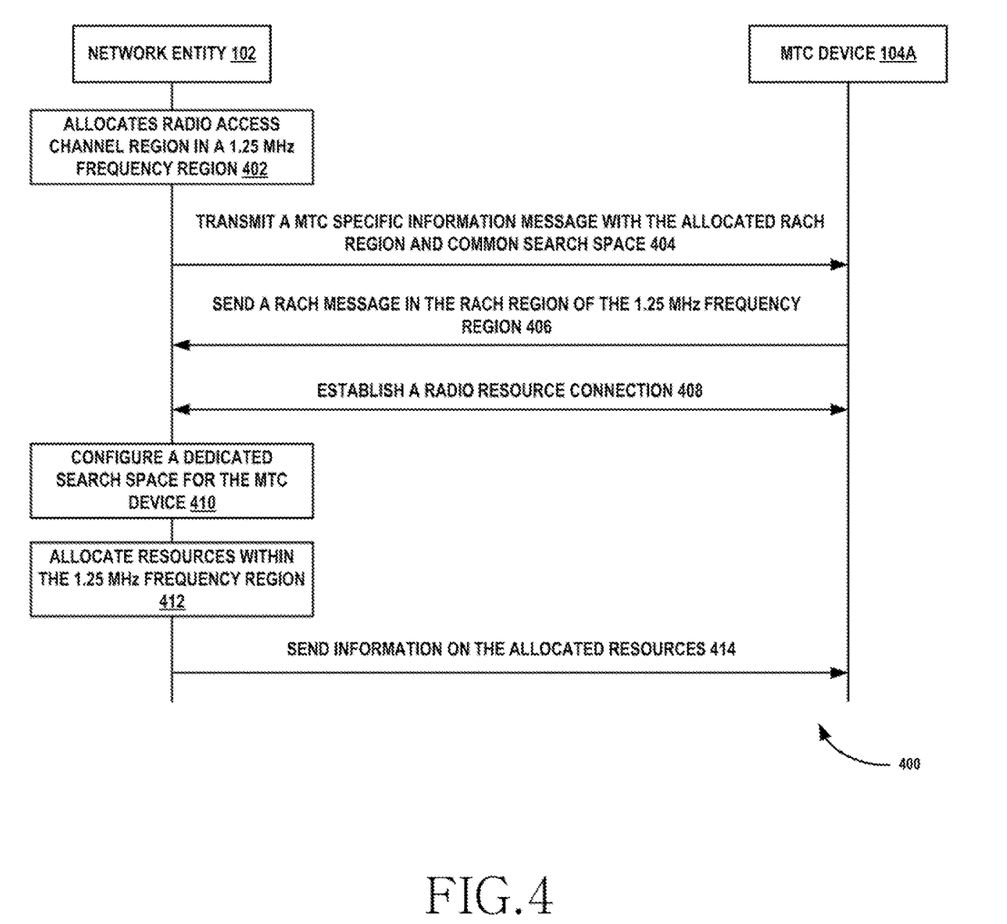
FIG. 4 is a flow diagram illustrating an exemplary method of establishing a radio resource connection with a low bandwidth MTC device over a dedicated frequency region, according to one embodiment.

FIG. 4 is a flow diagram 400 illustrating an exemplary method of establishing a radio resource connection with a low bandwidth MTC device 104A over a dedicated frequency region, according to one embodiment. At step 402, the network entity 102 allocates a radio access channel (RACH) region in a frequency region dedicated for low bandwidth MTC devices (herein after referred to as '1.25 MHz frequency region') to the MTC device 104A. At step 404, the network entity 102 transmits a MTC specific information message indicating the allocated RACH region and a common search space to the MTC device 104A.

At step 406, the MTC device 104A sends a RACH message on the RACH region in the 1.25 MHz frequency region. At step 408, the network entity 104A establishes a Radio Resource Connection with the MTC device 104A. At step 410, the network entity 102 configures a dedicated search space for the MTC device 104A upon successful establishment of the radio resource connection as shown in FIG. 10.

Figure 6:
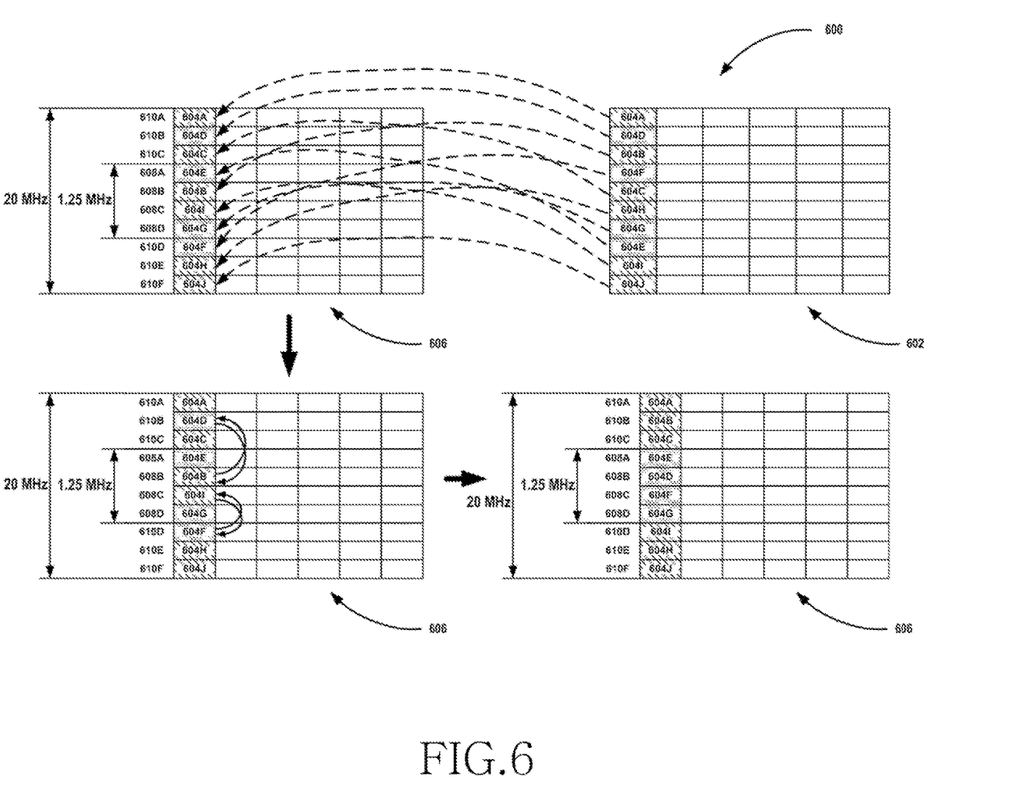
FIG. 6 is a schematic representation illustrating a process of mapping data bits to appropriate resource elements of a physical channel, according to one embodiment.

At step 412, the network entity 102 allocates resources for the MTC device 104A within the 1.25 MHz frequency region. For example, the resources may include resource elements in the physical channel falling within the 1.25 MHz frequency region. In one embodiment, resource elements in an entire radio frame falling within the 1.25 MHz frequency region are allocated to the MTC device 104A and resource elements falling outside the 1.25 MHz frequency region but falling within 20 MHz frequency band are allocated to legacy devices 106A-N as shown in FIG. 6.

Figure 8:
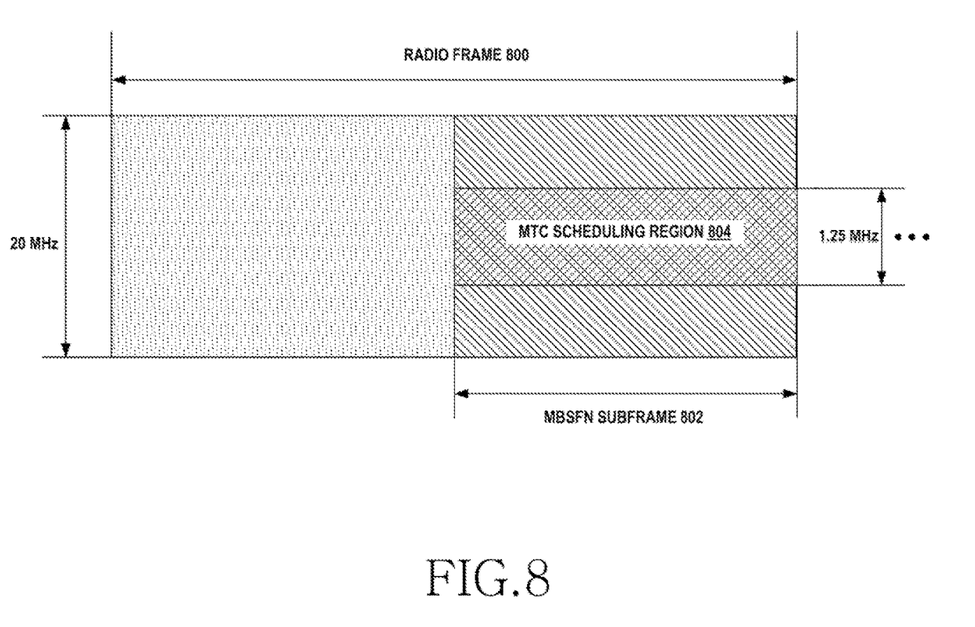
FIG. 8 is a schematic representation illustrating of an exemplary radio frame containing a MBSFN subframe with a MTC scheduling region, according to one embodiment.

In another embodiment, resource elements in one of subframes of a radio frame are allocated exclusively for low bandwidth MTC devices 104A-N while the resource elements in remaining subframes of the radio frame are allocated to the legacy devices 106A-N as illustrated in FIG. 8. In this embodiment, a MTC scheduling region(s) is defined in the subframe and resource elements falling within the MTC scheduling region are allocated to the MTC devices 104A-N. For example, when an evolved Node B 102 supports multi-media broadcast multicast over single frequency network (MBSFN) service, the eNodeB 102 allocates a MTC scheduling region in a subframe of a radio frame exclusively for the low bandwidth MTC devices 104A-N, where the radio frame is of 20 MHz bandwidth and the MTC scheduling region in the allocated subframe is having a bandwidth of 1.25 MHz within 20 MHz. In one exemplary implementation, a MBSFN subframe in a radio frame is allocated to the MTC devices 104A-N. In another exemplary implementation, a blank subframe in the radio frame is allocated to the MTC devices 104A-N. The eNodeB 102 indicates allocation of MTC scheduling region in the MBSFN/blank subframe through a master information block (MIB) message and indicates remaining information through a newly defined system information message. Also, the eNodeB 102 also notifies specific scheduling of the newly defined system information message in the MIB message when such scheduling is not known to the MTC devices 104A-N. Additionally, the eNodeB 102 indicates whether it supports multiple bandwidths to the MTC devices 104A-N using a bit indicator in the MIB message or the system information block message. Further, the eNodeB 102 indicates bandwidths supported for the low cost MTC devices 104A-N via a d1_MTC-bandwidth enumerated string as shown in Appendix 'A' and Appendix 'B'.

At step 414, the network entity 102 sends resources allocated within the 1.25 MHz frequency region to the MTC device 104A. For example, the allocation of the MTC scheduling region is indicated to the MTC devices 104A-N in a master information block message or a system information block message.

Figure 5:
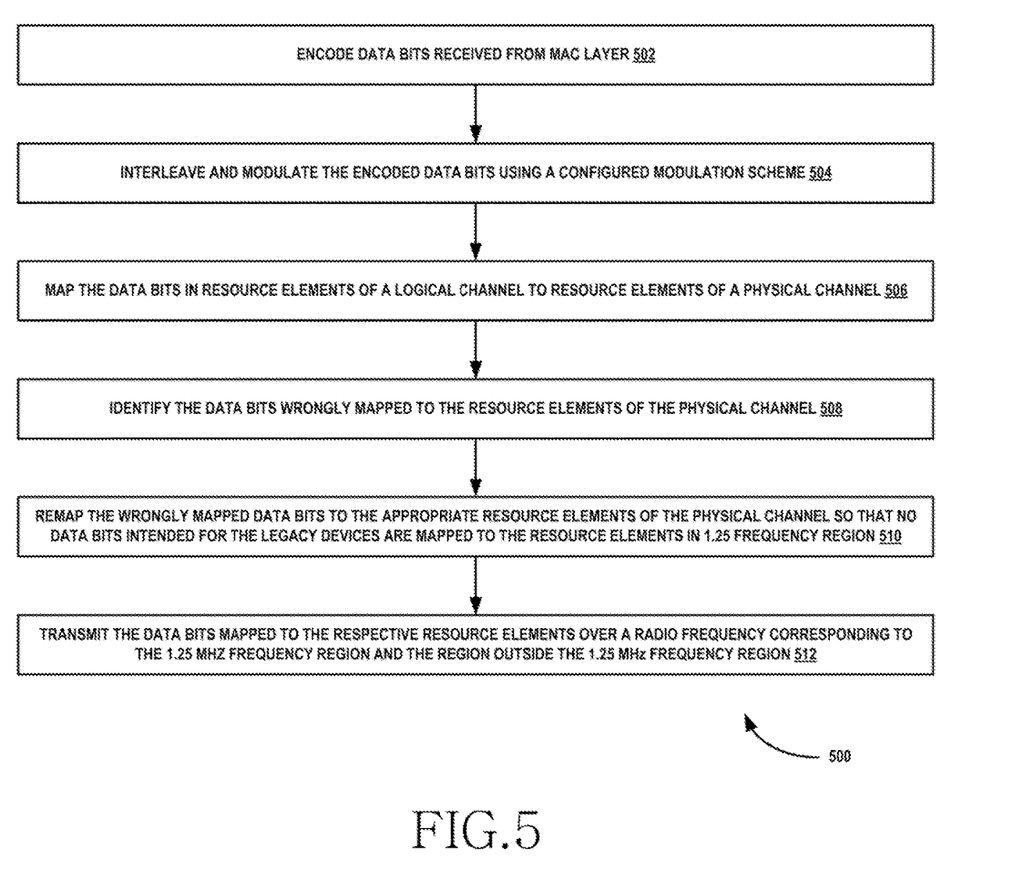
FIG. 5 is a process flowchart illustrating an exemplary method of communicating data bits over a 1.25 MHz frequency region dedicated for low bandwidth MTC devices in a LTE network, according to one embodiment.

FIG. 5 is a process flowchart 500 illustrating an exemplary method of communicating data bits over a 1.25 MHz frequency region dedicated for low bandwidth MTC devices 104A-N in a LTE network, according to one embodiment. Particularly, FIG. 5 illustrates a process steps performed at the PHY layer 208. At step 502, data bits received from the MAC layer 206 are encoded using an appropriate encoding technique. At step 504, the encoded data bits are interleaved and modulated using a configured modulation scheme (e.g., QPSK modulation scheme).

At step 506, the data bits in resource elements of a logical channel are mapped to resource elements of a physical channel. It can be noted that, the physical channel contains a first set resource elements which belong to 1.25 MHz frequency region and a second set of resource elements which belong to a region outside 1.25 MHz within a 20 MHz frequency band. For example, the data bits in the resource elements of the physical channel:

$$\tilde{n}_{PRB}(n_s) = (\tilde{n}_{VRB} + f_{hop}(i) \cdot N_{RB}^{sb} + ((N_{RB}^{sb} - 1) - 2(\tilde{n}_{VRB} \bmod N_{RB}^{sb})) \cdot f_m(i))$$

$$\bmod(N_{RB}^{sb} \cdot N_{sb})$$

$$i = \begin{cases} \lfloor n_s/2 \rfloor & \text{inter-subframe hopping} \\ n_s & \text{intra and inter-subframe hopping} \end{cases}$$

$$n_{PRB}(n_s) = \begin{cases} \tilde{n}_{PRB}(n_s) & N_{sb} = 1 \\ \tilde{n}_{PRB}(n_s) + \lceil N_{RB}^{HO}/2 \rceil & N_{sb} > 1 \end{cases}$$

$$\tilde{n}_{VRB} = \begin{cases} n_{VRB} & N_{sb} = 1 \\ n_{VRB} - \lceil N_{RB}^{HO}/2 \rceil & N_{sb} > 1 \end{cases}$$

where $n_{VRB}$ is obtained from scheduling grant. The parameter pusch-Hopping Offset ($N_{RB}^{HO}$) is provided by the MAC layer 206. The size $N_{RB}^{sb}$ of each sub-band is given by:

$$N_{RB}^{sb} = \begin{cases} N_{RB}^{UL} & N_{sb} = 1 \\ \lfloor (N_{RB}^{UL} - N_{RB}^{HO} - N_{RB}^{HO} \bmod 2)/N_{sb} \rfloor & N_{sb} > 1 \end{cases}$$

where, the number of sub-bands $N_{sb}$ is given by the MAC layer 206. The function $f_m(i) \in \{0,1\}$ determines whether mirroring is used or not. The parameter Hopping-mode determines if hopping is "inter-subframe" or "intra and inter-subframe".

The hopping function $f_{hop}(i)$ and the function $f_m(i)$ are given by:

$$f_{hop}(i) = \begin{cases} 0 & N_{sb} = 1 \\ \left(f_{hop}(i-1) + \sum_{k=i\cdot 10-1}^{i\cdot 10+9} c(k) \times 2^{k-(i\cdot 10+1)}\right) \bmod N_{sb} & N_{sb} = 2 \\ \left(f_{hop}(i-1) + \left(\left(\sum_{k=i\cdot 10+1}^{i\cdot 10-9} c(k) \times 2^{k-(i\cdot 10-1)}\right) \bmod(N_{sb}-1)\right) + 1\right) \bmod N_{sb} & N_{sb} > 2 \end{cases}$$

$$f_m(i) = \begin{cases} i \bmod 2 & N_{sb} = 1 \text{ and intra and} \\ & \text{inter-subframe hopping} \\ \text{CURRENT\_TX\_NB} \bmod 2 & N_{sb} = 1 \text{ and} \\ & \text{inter-subframe hopping} \\ c(i \cdot 10) & N_{sb} > 1 \end{cases}$$

where $f_{hop}(-1)=0$ and the pseudo-random sequence c(i) is given by section 7.2 and CURRENT_TX_NB indicates the transmission number for the transport block transmitted in slot $n_s$. The pseudo-random sequence generator shall be initialised with $c_{init}=N_{ID}^{cell}$ for frame structure type 1 and $c_{init}=2^2 \cdot (n_f \bmod 4)+N_{ID}^{cell}$ for frame structure type 2 at the start of each frame.

At step 508, the data bits intended for the legacy devices 106A-N but mapped to the first set of resource elements of the MTC devices 104A-N are identified. Similarly, at step 508, the data bits intended for the MTC device 104A-N but mapped to the second set of resource elements of the legacy devices 106A-N are identified. At step 510, the data bits intended for the legacy devices 106A-N are remapped to the second resource elements and the data bits intended for the MTC devices 104A-N are remapped to the first set of resource elements. In one embodiment, the eNodeB 102 remaps data bits intended for the legacy devices 106A-N to the resource elements outside the 1.25 MHz frequency region as follows:

If $n_{prb1.25}==n_{prb20}$, $n_{prb20}=fn_{20}(fn^{-1}_{1.25}(n_{prb1.25}))$ where, $n_{prb1.25}$ is Physical Resource Block (PRB) for 1.25 MHz frequency region calculated using the conventional formula, $fn_{20}$ is the conventional formula for 20 MHz frequency band, and $fn^{-1}_{1.25}$ is the reverse conventional formula (i.e., the reverse mapping from the physical channel to logical channels).

At step 512, the data bits mapped to the respective resource elements are transmitted over a radio frequency corresponding to the 1.25 MHz frequency region and the region outside the 1.25 MHz frequency region to the MTC devices 104A-N and the legacy devices 106A-N respectively.

FIG. 6 is a schematic representation 600 illustrating a process of mapping data bits to appropriate resource elements of a physical channel, according to one embodiment. As depicted, a logical channel 602 contains data bits 604A-J in resource elements 606A-J. The data bits 604A-J are intended for the MTC devices 104A-N and the logical devices 106A-N. A physical channel 606 contains a first set of resource elements 608A-D which corresponds to the 1.25 MHz frequency region and a second set of resource elements 610A-F which corresponds to region outside the 1.25 MHz frequency region in the 20 MHz frequency band.

Prior to transmitting the data bits 604A-J, the eNodeB 102 maps the modulated data bits 604A-J to the resource elements 608A-D, 610A-F of the physical channel 606. It can be seen that the data bits 604B and 604I are mapped to the resource elements 608A and 608C while the data bits 604D and 604F are mapped to the resource elements 610B and 610F. However, the data bits 604B and 604I should have been mapped to the resource elements 610B and 610F while the data bits 604D and 604F should have been mapped to the resource elements 608A and 608C. This is because, the data bits 604D and 604F are intended for the MTC devices 104A-N and should be transmitted over 1.25 MHz frequency region. Similarly, the data bits 604B and 604I are intended for the legacy devices 104A-N and should be transmitted over frequencies falling outside the 1.25 MHz frequency region.

In this scenario, the eNodeB 102 identifies wrongly mapped data bits (i.e., data bits 604B, 604D, 604F, and 604I) and remaps the data bits 604D and 604F to the resource elements 608A and 608C, and the data bits 604B and 604I to the resource elements 610B and 610F. Thus, the data bits 604D-G are correctly mapped to resource elements 608A-D belonging to the 1.25 MHz frequency region reserved for the MTC devices 104A-N.

Figure 7:
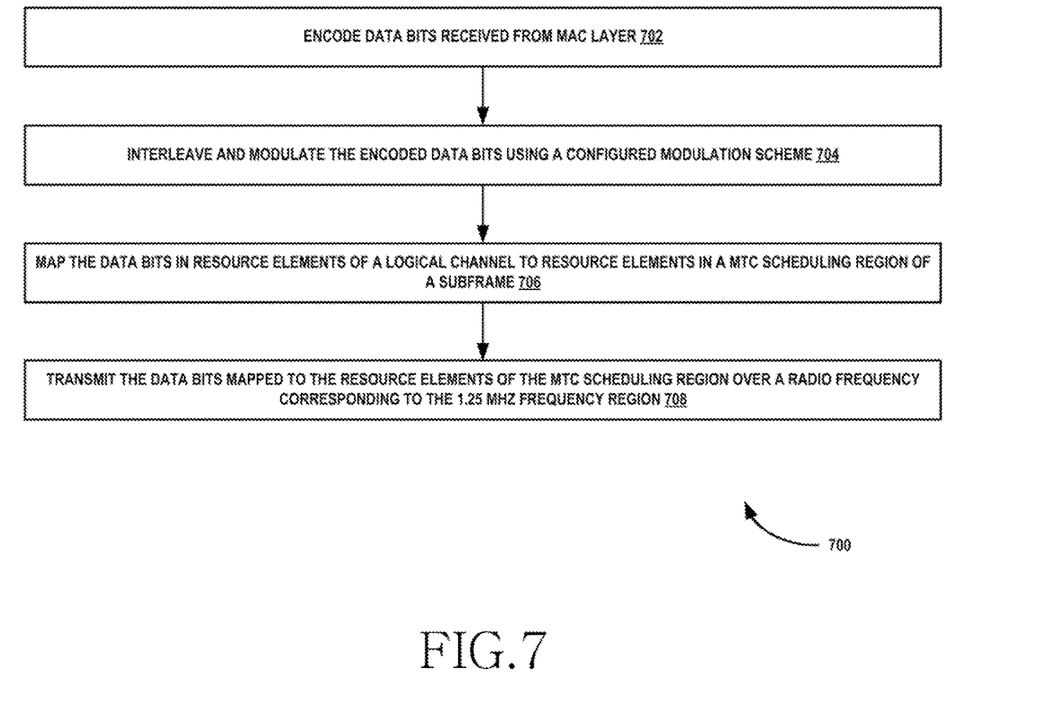
FIG. 7 is a process flow chart illustrating an exemplary method of communicating data bits over a 1.25 MHz frequency region dedicated for low bandwidth MTC devices in the LTE network, according to another embodiment.

FIG. 7 is a process flow chart 700 illustrating an exemplary method of communicating data bits over a 1.25 MHz frequency region dedicated for low bandwidth MTC devices 104A-N in the LTE network, according to another embodiment. At step 702, data bits received from the MAC layer 206 are encoded using an appropriate encoding technique. At step 704, the encoded data bits are interleaved and modulated using a configured modulation scheme (e.g., QPSK modulation scheme).

At step 706, data bits intended for the MTC devices 104A-N are mapped to resource elements in the MTC scheduling region of the subframe. At step 708, the data bits mapped to the resource elements are transmitted to the MTC devices 104A-N over a radio frequency corresponding to the MTC scheduling region.

FIG. 8 is a schematic representation illustrating of an exemplary radio frame 800 containing a MBSFN subframe 802 with a MTC scheduling region 804, according to one embodiment. The radio frame of 20 MHz contains a plurality of subframes with a MBSFN subframe 802. The MBSFN subframe 802 includes a MTC scheduling region 804 of 1.25 MHz. When MBSFN data is being transmitted on a time slot, the eNodeB 102 maps data bits to resource elements of the MBSFN subframe 802 on the entire 20 MHz bandwidth. When MTC data is being transmitted or received on a time slot, in one embodiment, the eNode B 102 maps data bits intended for MTC devices 104A-N to resource elements belonging 1.25 Mhz frequency region in the MBSFN subframe 802.

Figure 9:
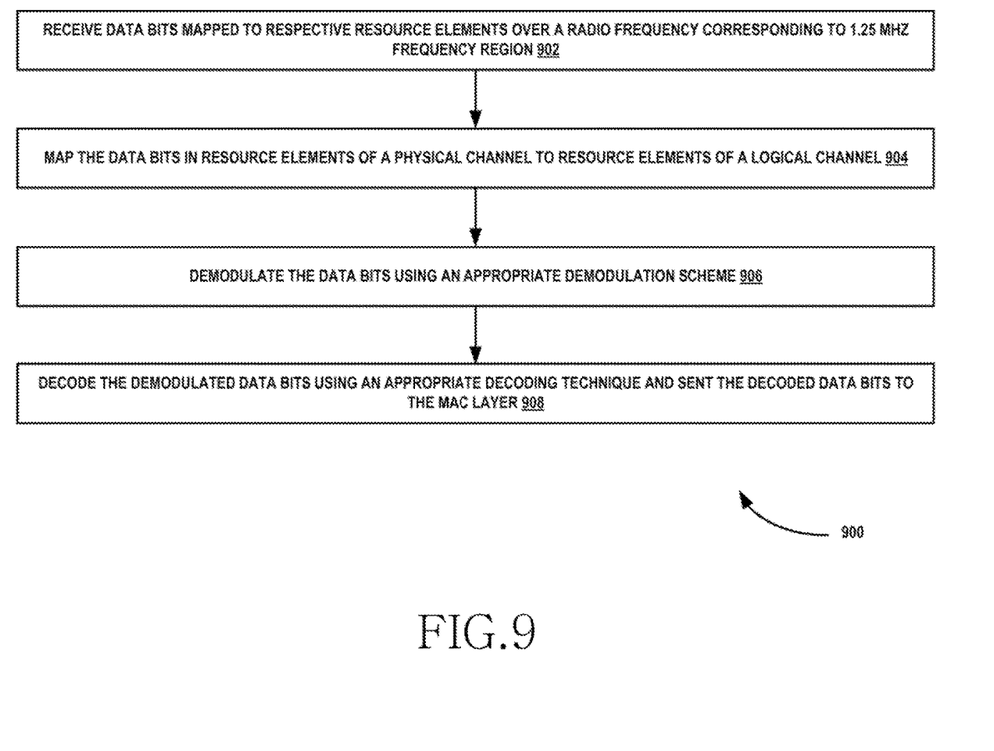
FIG. 9 is a process flow chart illustrating an exemplary method of processing the received data bits by a low bandwidth MTC device, according to one embodiment.

FIG. 9 is a process flow chart 900 illustrating an exemplary method of processing the received data bits by the low bandwidth MTC device 104A, according to one embodiment. At step 902, data bits transmitted over the radio frequency corresponding to the 1.25 MHz frequency region is received by the MTC device 104A. At step 904, the received data bits that are mapped to the resource elements in the 1.25 MHz frequency region of the physical channel are re-mapped to the respective resource elements of the logical channel.

At step 906, the data bits mapped to the respective resource elements of the logical channel are demodulated using an appropriate demodulation scheme. At step 908, the demodulated data bits mapped to the respective resource elements of the logical channel are decoded using an appropriate decoding technique and sent to the MAC layer 206 for further processing.

Apart from the embodiments described in FIGS. 1 to 9, the eNodeB 102 can transmit data to the MTC devices 104A-N by bundling the MTC devices 104A-N into a paging cycle. If the MTC devices 104A-N are bundled into a paging cycle, the eNodeB 102 indicates to the MTC devices 104A-N in dedicated signalling mechanism (e.g., dedicated non-access stratum (NAS) message).

The present embodiments have been described with reference to specific example embodiments, it will be evident that various modifications and changes may be made to these embodiments without departing from the broader spirit and scope of the various embodiments. Furthermore, the various devices, modules, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

The invention claimed is:

1. A base station in a wireless environment, the base station, comprising:
at least one transceiver; and
at least one processor operatively coupled to the at least one transceiver,
wherein the at least one processor is configured to:
transmit a message for at least one machine type communication (MTC) user equipment (UE) including:
information for indicating a random access channel (RACH) region for the at least one MTC UE, and
information for indicating a common search space,
establish a radio resource control (RRC) connection with a MTC UE based on a signal transmitted on the RACH region,
transmit, to the MTC UE, a configuration message including information for indicating a dedicated search space of a control channel dedicated for the MTC UE based on the RRC connection, and
transmit, on the dedicated search space, resource allocation for data in a frequency region to the MTC UE,
wherein the frequency region corresponds to a bandwidth within a system bandwidth, and
wherein the frequency region includes consecutive physical resource blocks (PRBs) in a frequency domain.

2. The base station of claim 1, wherein the at least one processor is further configured to:
transmit, to the MTC UE, a master information block (MIB) including:
bandwidth information for indicating the system bandwidth, and
scheduling information for a system information message for the MTC UE.

3. The base station of claim 1,
wherein the bandwidth is a most narrow bandwidth among a plurality of bandwidths defined by a long term evolution (LTE) communication system.

4. The base station of claim 1, wherein the at least one processor is further configured to:
map first bits of data for the MTC UE to first resource blocks (RBs) within the frequency region;
map second bits of data for a non-MTC UE to second RBs within the system bandwidth; and
if at least one of the second bits is mapped to at least one of the first RBs, remap the at least one of the second bits to at least one of the second RBs outside of the frequency region.

5. A machine type communication (MTC) user equipment (UE) in a wireless environment, the MTC UE comprising:
at least one transceiver; and
at least one processor operatively coupled to the at least one transceiver,
wherein the at least one processor is configured to:
receive, from a base station, a message for at least one MTC UE including:
information for indicating a random access channel (RACH) region for the at least one MTC UE, and
information for indicating a common search space,
establish a radio resource control (RRC) connection with the base station based on a signal transmitted on the RACH region,
receive, from the base station, a configuration message including information for indicating a dedicated search space of a control channel dedicated for the MTC UE based on the RRC connection, and
receive, on the dedicated search space, resource allocation for data allocated in a frequency region from the base station,
wherein the frequency region corresponds to a bandwidth within a system bandwidth, and
wherein the frequency region includes consecutive physical resource blocks (PRBs) in a frequency domain.

6. The MTC UE of claim 4, wherein the at least one processor is further configured to:
receive, from the base station, a master information block (MIB) including:
bandwidth information for indicating the system bandwidth, and
scheduling information for a system information message for the MTC UE.

7. The MTC UE of claim 5,
wherein the bandwidth corresponds to a most narrow bandwidth among a plurality of bandwidths defined by a long term evolution (LTE) communication system.

8. A method performed by a base station in a wireless environment, the method comprising:
transmitting a message for at least one machine type communication (MTC) user equipment (UE), including:
information for indicating a random access channel (RACH) region for the at least one MTC UE, and
information for indicating a common search space,
establishing a radio resource control (RRC) connection with an MTC UE based on a signal transmitted on the RACH region;
transmitting, to the MTC UE, a configuration message including information for indicating a dedicated search space of a control channel dedicated for the MTC UE based on the RRC connection; and
transmitting, on the dedicated search space, resource allocation for data in a frequency region to the MTC UE,
wherein the frequency region corresponds to a bandwidth within a system bandwidth, and
wherein the frequency region includes consecutive physical resource blocks (PRBs) in a frequency domain.

9. The method of claim 8, further comprising:
transmitting, to the MTC UE, a master information block (MIB) including:
bandwidth information for indicating the system bandwidth, and
scheduling information for a system information message for the MTC UE.

10. The method of claim 8,
wherein the bandwidth corresponds to a most narrow bandwidth among a plurality of bandwidths defined by a long term evolution (LTE) communication system.

11. The method of claim 8, further comprising:
mapping first bits of data for the MTC UE to first resource blocks (RB)s within the frequency region;
mapping second bits of data for a non-MTC UE to second RBs within the system bandwidth; and
if at least one of the second bits is mapped to at least one of the first RBs, remapping the at least one of the second bits to at least one of the second RBs and outside of the frequency region.

12. A method performed by a machine type communication (MTC) user equipment (UE) in a wireless environment, the method comprising:
receiving, from a base station, a message for at least one MTC UE including:
information for indicating a random access channel (RACH) region for the at least one MTC UE, and
information for indicating a common search space;
establishing a radio resource control (RRC) connection with the base station based on a signal transmitted on the RACH region;
receiving, from the base station, a configuration message including information for indicating a dedicated search space of a control channel dedicated for the MTC UE based on the RRC connection; and
receiving, on the dedicated search space, resource allocation for data in a frequency region from the base station,
wherein the frequency region corresponds to a bandwidth within a system bandwidth, and
wherein the frequency region includes consecutive physical resource blocks (PRBs) in a frequency domain.

13. The method of claim 12, further comprising:
receiving, from the base station, a master information block (MIB) including:
bandwidth information for indicating the system bandwidth, and
scheduling information for a system information message for the MTC UE.

14. The method of claim 12,
wherein the bandwidth corresponds to a most narrow bandwidth among a plurality of bandwidths defined by a long term evolution (LTE) communication system.

* * * * *

UNITED STATES PATENT AND TRADEMARK OFFICE
CERTIFICATE OF CORRECTION

PATENT NO. : 10,880,713 B2
APPLICATION NO. : 15/598190
DATED : December 29, 2020
INVENTOR(S) : Satish Nanjunda Swamy Jamadagni et al.

Page 1 of 1

It is certified that error appears in the above-identified patent and that said Letters Patent is hereby corrected as shown below:

On the Title Page

Foreign Application Priority Data, Item (30):
"Nov. 18, 2011 (IN) .............................. 3967/CHE/2011"
Should read:
--Nov. 18, 2011 (IN) ............................. 3967/CHE/2011
Nov. 19, 2012   (IN) .............................. 3967/CHE/2011--.

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*